United States Patent Office 3,291,745
Patented Dec. 13, 1966

3,291,745
STABILIZATION OF TRICHLORETHYLENE
Theodore F. Martens, West Chester, Pa., assignor to E. I. du Pont de Nemours and Company, Wilmington, Del., a corporation of Delaware
No Drawing. Filed Apr. 29, 1963, Ser. No. 276,176
6 Claims. (Cl. 252—171)

This invention relates to stabilized trichlorethylene compositions and to processes for treating metal surfaces therewith.

Trichlorethylene is extensively used in industry as a solvent, especially for the degreasing of metals. It is also useful as the predominant ingredient in certain anhydrous phosphatizing, chromatizing, and/or painting compositions. These uses frequently involve exposure of the trichlorethylene over long periods of time to conditions which tend to promote its decomposition. Such conditions include elevated temperatures, the presence of oxidants, the presence of ultraviolet light, the presence of certain metal-containing compounds, the presence of free hydrogen chloride, and complex combinations thereof.

In order to overcome this tendency toward decomposition, a wide variety of stabilizers have been suggested. Included among these are a number of olefinically unsaturated compounds such as amylene (U.S. 1,904,450), diisobutylene (U.S. 2,435,312), cyclohexene (U.S. 2,517,894), and compounds containing both olefinic and acetylenic unsaturation (Br. 773,632); amines and related nitrogen-containing compounds such as pyridine, triethyl amine, diisopropyl amine, hydrazones, and N-methyl pyrrole (U.S. 2,492,048); phenols such as p-tertiary amyl phenol (U.S. 2,115,723), butylated hydroxy toluene, and thymol; epoxides and cyclic ethers such as glycidol, butylene oxide, epichlorhydrin, and tetrahydrofuran; lactones; unsaturated nitriles; esters; aliphatic alcohols; acetylenic alcohols; and combinations of these and other compounds.

The functioning of a number of these prior art stabilizers, and notably the functioning of many of the preferred antioxidants, appears to be impaired by the presence of free hydrogen chloride in the system. In fact, any free HCl which is present in the system seems to be a key intermediate in a vicious circle involving further decomposition of the trichlorethylene. Accordingly, many stabilizer systems include one or more compounds designed to react or combine with this free HCl in such a way as to destroy its harmful effect. Unfortunately, most of these compounds also react or combine with one or more other materials which are apt to be present, including water, alcohols, other acids, and certain amines; and in so doing, they are generally wasted.

It is an object of the present invention to provide improved trichlorethylene-based compositions. It is a further object to provide better stabilizer systems for trichlorethylene. A further object is to provide stabilized trichlorethylene which, when used under commercial conditions, will contain a minimum of free HCl. A still further object is to provide more effective combinations of antioxidants and HCl removers, for use in trichlorethylene. Another object is to provide improved metal-treating processes, using stabilized trichlorethylene-based compositions. Other objects will appear hereinafter.

This invention is based upon the observation that certain dimerizable diene compounds and the dimers thereof function as superior stabilizers for trichlorethylene, both when used by themselves and when used in combinations with other stabilizers, notably when used in combination with antioxidants. The stabilizers which have been found to be especially effective are 1,3-cyclopentadiene and its dimer (dicyclopentadiene); 5-methyl-1,3-cyclopentadiene and its dimer; and 1-methoxy-1,3-butadiene and its dimer.

Under many of the usage conditions to which the thus stabilized trichlorethylene-containing compositions are exposed, it appears that an equilibrium is set up between the dimerizable diene and its dimer. Two molecules of the diene tend to combine with each other by means of a Diels-Alder type of condensation to give the corresponding dimer. This dimer, in turn, may be converted back into the original diene. Accordingly, for a number of the usage conditions, one may originally introduce only the initial diene compound or only the corresponding dimer; nevertheless, after a period of usage, for example, in a vapor degreaser, the stabilized trichlorethylene will be found to contain both the diene and its dimer. The dimers are also diolefinically unsaturated, but have twice the molecular weight of the original diene compounds.

The stabilized trichlorethylene compositions of the present invention may be used in the degreasing of a wide variety of metals and metal objects, including ferrous metals, aluminum and aluminum alloys, and zinc galvanized articles. The compositions may be applied cold or hot, either by dipping or by spraying. Preferably, the compositions are used in the well-known vapor degreaser type of apparatus, in which the trichlorethylene is continuously being boiled up from a sump to produce a dense vapor zone, with cooling coils located near the top of the apparatus to define the top of the vapor zone. An article to be cleansed is passed into this vapor zone and the vapors continuously condense on the article, dissolving the grease and other soilants. The condensed solvent then drips off the article, carrying the grease, etc., down into the sump.

In a degreaser apparatus of this type, a given stabilizer ingredient may function in the liquid zone, or in the vapor zone, or both. In any event, however, the maintaining of effective stabilization in both phases is important not only from the viewpoint of preventing loss of trichlorethylene, but also from the viewpoint of preventing corrosion. The by-products resulting from the decomposition of the trichlorethylene are highly corrosive toward many of the ferrous metals which are preferred as the materials of construction for the different parts of a vapor degreaser. They are also corrosive toward many of the metals and metal objects which are apt to be passed through the degreaser as part of the work load.

It is believed that the particular usefulness of the stabilizers of the present invention may be related to their ability to undergo the above-described reversible dimerization reaction. The dimer tends to be relatively higher boiling and thus tends to remain in the liquid zone of a vapor degreaser; whereas the original diene itself tends to be relatively lower boiling and thus tends to be boiled up continuously into the vapor zone and to condense with the condensing trichlorethylene vapors. The equilibrating tendency of the diene and the dimer helps to insure that neither the vapor zone nor the liquid zone will become depleted of stabilizer.

The stabilizers of the present invention are believed to function both by adding HCl at the olefinic bonds and as anti-oxidants. These compounds contain a high proportion of double bonds per unit of weight, as compared with most of the prior art stabilizers. Furthermore, the conjugated relationship of the double bonds is believed to provide a regulated activity, without at the same time introducing the acetylenic linkage, which often seems to be overly active.

The amount of diene compound (or dimer thereof, or combination of diene plus dimer) which is used is generally in the range of from about 0.01% to about 1.0% by weight, based upon the total weight of the trichlorethylene-containing composition. Larger or smaller concentrations, however, may occasionally be useful. Preferred concentrations are in the range of from 0.05% to 0.5% by weight.

The stabilizers of the present invention may be used with other known stabilizers for trichlorethylene, particularly with those mentioned hereinbefore. They may also be used with unsaturated nitriles such as acrylonitrile and methacrylonitrile; with hydrazones such as formaldehyde diethyl hydrazone and acetaldehyde dimethyl hydrazone; with esters such as ethyl acetate, methyl propionate, and butyl acetate; with aliphatic alcohols such as n-butanol, isobutanol, tertiary butanol, n-pentanol, and pentanol-2; with acetylenic alcohols, such as propargyl alcohol; and with other known stabilizers.

According to a preferred embodiment of the invention, the diene compounds are used in combination with stabilizers of the antioxidant type such as p-tertiary amyl phenol, butylated hydroxy toluene, butylated hydroxy anisole, thymol, and N-methyl pyrrole. When used in conjunction with the diene compounds, these antioxidants are generally present in amounts between about 0.001% and about 0.1% by weight, based upon the total weight of the trichlorethylene-containing composition, and preferably between about 0.003% and about 0.03% by weight. Particularly preferred are the combinations involving the use of one of the diene compounds together with N-methyl pyrrole.

These antioxidant-type compounds are believed to be especially sensitive to the presence of free HCl and therefore function very much more efficiently when one of the diene compounds is present for selectively eliminating this HCl. The scope of this invention should not be restricted, however, by any of the foregoing theories regarding the mechanism by which these various stabilizers are believed to function.

In recent years, trichlorethylene-containing compositions have been found to be highly useful in industrial painting processes, in anhydrous phosphatizing processes, and in anhydrous chromatizing processes. In all of these compositions, the trichlorethylene is the predominant ingredient, in the sense that it accounts for at least 50% of the weight of the total composition, and usually at least 60% or 70% of the total. A typical paint composition may contain from 50% to 95% of trichlorethylene, together with one or more vehicles or resinous binders, one or more pigments or hiding agents in finely-divided form, one or more extenders, one or more coalescing agents, etc. A typical phosphatizing composition may contain from 85% to 99% of trichlorethylene, together with a small amount of phosphoric acid and/or one or more other phosphate compounds, one or more ingredients to promote the solubility of the phosphoric ingredient in the trichlorethylene, etc. A typical chromatizing composition may contain from 85% to 99% of trichlorethylene, together with a small amount of chromic acid and/or one or more other chromate compounds, one or more ingredients for solubilizing the chromic ingredient, one or more promoters, etc. Frequently, these compositions are initially supplied as concentrates, with additional amounts of trichlorethylene and/or other ingredients being added as required at the point of use. For example, some of the necessary ingredients for phosphatizing processes or for chromatizing processes may be supplied in compositions which contain no more than 55% or 60% of trichlorethylene.

In such instances, it is highly desirable not only that the compositions be properly stabilized when actually being employed for their intended use, but also that the initial concentrates be properly stabilized in order to prevent decomposition which may occur, for example, merely in storage, especially in hot climates. Secondly, it is desirable that these concentrates contain stabilizers which either are the same as, or at least are compatible with, the stabilizers in the trichlorethylene that is to be used for thinning purposes. Thirdly, it is often desirable to operate a multistep process involving two, three, or even four of the operations of degreasing, phosphatizing, chromatizing and/or painting in an overall sequence. In such instances, it is highly desirable that the trichlorethylene-containing compositions employed in the various operations all contain the same stabilizers, or at least contain stabilizers which are compatible with one another. This is particularly important where two or more of these operations are to be carried out under a single common, interconnecting trichlorethylene-containing vapor zone.

The stabilizers contemplated herein are useful in many of the foregoing respects. In particular, they are compatible with many of the acidic phosphatizing and/or chromatizing compositions, and they are compatible with the wide assortment of ingredients found in different paint compositions. They accordingly exhibit marked advantages over the prior art stabilizers, most of which are consumed or destroyed by interaction, for example, with strong acids such as phosphoric and chromic acid.

The stabilizers of the present invention are evaluated by means of a standard stability test. In this test, the trichlorethylene composition is placed in a flask and is refluxed for four hours under exposure to ultraviolet light, with oxygen gas being bubbled up continuously through the refluxing composition. The effluent gases are scrubbed with water to remove the volatile acids, primarily HCl. The condensed trichlorethylene is automatically returned to the flask, for further exposure to oxygen and UV light. After four hours, the aqueous layer is titrated for acid. The amount of acid generated, which is reported in terms of milliliters of 1-normal acid, is a direct measure of the tendency of the trichlorethylene to degrade in the presence of oxygen and light.

*Examples 1 through 4*

In order to have a basis against which to compare the diene compounds of the present invention, standard stability tests were run on straight unstabilized trichlorethylene and on trichlorethylene containing preferred concentrations of three of the best commercially-used antioxidants. The results of these tests are reported in Table I.

TABLE I

| Example No. | Stabilizer | Concentration (percent by weight) | Acidity (ml. of 1 N acid) |
|---|---|---|---|
| 1 | None | | 4 |
| 2 | p-Tertiary amyl phenol | 0.01 | 1.3 |
| 3 | Phenol | 0.01 | 1.2 |
| 4 | N-methyl pyrrole | 0.01 | 0.9 |

*Examples 5 through 7*

Using the standard stability test procedure, runs were made in which three different diene compounds were added in stabilizing quantities to otherwise unstabilized trichlorethylene. In two of these instances, the compound was added in the form of the initially undimerized compound, whereas in the third instance, the dimer was employed. The results are reported in Table II.

TABLE II

| Example No. | Diene Compound | Concentration (percent by weight) | Acidity (ml. of 1 N acid) |
|---|---|---|---|
| 5 | 5-methyl-1,3-cyclopentadiene | 0.1 | 0.3 |
| 6 | 1-methoxy-1,3-butadiene | 0.1 | 0.4 |
| 7 | Dicyclopentadiene | 0.1 | 0.2 |

It will be noted that each of these diene compounds, when used alone, gave very effective stabilization which in general was greatly superior to that obtained when using any of the three widely-used prior art stabilizers shown in Examples 2 through 4.

*Example 8*

Using the same test procedure, a run was made in which a pair of stabilizers was added to otherwise unstabilized trichlorethylene. The sample contained 0.005% of N-methyl pyrrole (i.e., half the amount that was employed in Example 4). In addition, the sample contained 0.1% of 5-methyl-1,3-cyclopentadiene (i.e., the same amount as was employed in Example 5). The amount of acidity produced was 0.14 ml., which was markedly superior to the results obtained when using only one of these stabilizers at a time.

*Example 9*

This example is intended to show the ability of the stabilizers of the present invention to function in both the liquid and the vapor phases. A composition was prepared by adding 0.1% of 5-methyl-1,3-cyclopentadiene to otherwise unstabilized trichlorethylene (i.e., the same as Example 5). This composition was distilled until 50% of the total composition had been distilled overhead and condensed into a separate container. This "50% distillate," when subjected to the standard stability test procedure, produced 0.6 ml. of acidity. In other words, the stabilizer which was carried along with the trichlorethylene during vaporization and condensation was sufficient to give results which were better than those obtained initially with some of the most widely used of the prior art stabilizers, as shown in Examples 2 through 4.

Since it will be apparent that many modifications and changes can be made without departing from the spirit of this invention, the invention should not be construed as limited by the specific examples included herein or otherwise than by the claims appended hereto.

I claim:
1. A stabilized composition comprising trichlorethylene as the predominant ingredient and containing a stabilizing amount of at least one member from the group consisting of a mixture of 1,3-cyclopentadiene with its dimer, a mixture of 5-methyl-1,3-cyclopentadiene with its dimer, and a mixture of 1-methoxy-1,3-butadiene with its dimer.
2. A stabilized composition according to claim 1, which composition contains as a stabilizer from about 0.01% to about 1.0% by weight of a mixture of 1,3-cyclopentadiene and its dimer.
3. A stabilized composition according to claim 1, which composition contains as a stabilizer from about 0.01% to about 1.0% by weight of a mixture of 5-methyl-1,3-cyclopentadiene and its dimer.
4. A stabilized composition according to claim 1, which composition contains as a stabilizer from about 0.01% to about 1.0% by weight of a mixture of 1-methoxy-1,3-butadiene and its dimer.
5. A composition according to claim 1, which also contains from about 0.001% to about 0.1% by weight of N-methyl pyrrole.
6. A process which comprises treating a metal surface with a composition according to claim 1.

References Cited by the Examiner

UNITED STATES PATENTS

| 1,097,145 | 5/1914 | Snelling | 260—652.5 |
| 2,265,774 | 12/1941 | Lincoln et al. | 260—652.5 X |
| 2,870,094 | 1/1959 | Cathcart | 260—652.5 X |
| 2,944,088 | 7/1960 | Kauder | 260—652.5 X |
| 3,076,040 | 1/1963 | Skeeters | 260—652.5 |
| 3,090,818 | 5/1963 | Long | 260—652.5 |

LEON ZITVER, *Primary Examiner.*

DANIAL D. HORWITZ, *Examiner.*

M. M. JACOB, *Assistant Examiner.*